US009403189B2

(12) United States Patent
VanGemert et al.

(10) Patent No.: US 9,403,189 B2
(45) Date of Patent: Aug. 2, 2016

(54) FIBERGLASS GEL COAT COLOR MATCH AND REPAIR SYSTEM AND METHOD UTILIZING A MULTI CHAMBER DISPENSER DEVICE

(71) Applicant: Thomas John VanGemert, Grand Rapids, MI (US)

(72) Inventors: Thomas John VanGemert, Grand Rapids, MI (US); David Jon Warmenhoven, Grandville, MI (US)

(73) Assignee: Thomas John VanGemert, Grand Rapids, MI (US)

( * ) Notice: Subject to any disclaimer, the term of this patent is extended or adjusted under 35 U.S.C. 154(b) by 318 days.

(21) Appl. No.: 13/860,731

(22) Filed: Apr. 11, 2013

(65) Prior Publication Data

US 2014/0308432 A1 Oct. 16, 2014

(51) Int. Cl.

| | |
|---|---|
| ***B05D 3/00*** | (2006.01) |
| ***B32B 43/00*** | (2006.01) |
| ***B05D 5/00*** | (2006.01) |
| ***B44D 3/00*** | (2006.01) |

(52) U.S. Cl.

CPC ................ *B05D 5/005* (2013.01); *B44D 3/003* (2013.01)

(58) Field of Classification Search

CPC .................................. B05D 5/005; B05C 9/00

USPC .......................................................... 427/140

See application file for complete search history.

(56) References Cited

U.S. PATENT DOCUMENTS

| | | | |
|---|---|---|---|
| D361,509 | S | 8/1995 | Dull et al. |
| 5,554,197 | A | 9/1996 | Assini |

(Continued)

FOREIGN PATENT DOCUMENTS

| | | |
|---|---|---|
| EP | 1563757 | 8/2005 |
| WO | WO 2011089096 A1 * | 7/2011 |

OTHER PUBLICATIONS

Mehdi, Jamil; Gel Coat Repair; FiberGlassics website; Feb. 18, 2011.*

(Continued)

*Primary Examiner* — Michael Wieczorek

(74) *Attorney, Agent, or Firm* — Price Heneveld LLP

(57) ABSTRACT

The present invention relates to color matching and repair delivery systems and more particularly to the delivery of a gradient variety of shades of color of a gel coat, resin, and or paint in its liquid form, for the matching and repairing of and to existing colored surface and body structures and in the repair to gel coat and fiberglass surfaces and bodies typically found in and on boats, aircraft, tubs, showers, dock boxes and the like. The general purpose of the present invention relates to a method and delivery system for color matching gel coat to gel coat and fiberglass surfaces. The present invention and system allows users to color match their fiberglass gel coat surface repair by using a kit that eliminates the need for messy mixing of multiple components needed to perform the typical fiberglass gel coat repair. The system dispenser includes multiple chambers or component reservoirs that hold and contain the fiberglass gel coat resin color solution. Chamber number one (the main chamber) contains the "base" color while the remaining chambers contain the tint and shade colors. The multiple chambers form a unit with the attached pumping head. The variable extraction ratio of the base coat color and the tint or shade colors are controlled in the pump action head as it draws or pushes out the specified and chosen color mixing ratio as matched to the accompanied color match card.

7 Claims, 17 Drawing Sheets

(56) References Cited

U.S. PATENT DOCUMENTS

| | | | | |
|---|---|---|---|---|
| 5,971,210 | A | 10/1999 | Brugger | |
| 6,138,870 | A | 10/2000 | Lin | |
| 6,314,906 | B1 | 11/2001 | Tesfaye | |
| 6,440,175 | B1 | 8/2002 | Stanley, III | |
| 6,464,107 | B1 | 10/2002 | Brugger | |
| D497,104 | S | 10/2004 | Best et al. | |
| 6,920,904 | B2 | 7/2005 | Yquel | |
| 7,222,752 | B2 | 5/2007 | Ponton | |
| 7,461,987 | B2 | 12/2008 | Liechty | |
| 2007/0136958 | A1 | 6/2007 | Draghiceanu | |
| 2009/0052971 | A1 | 2/2009 | Pires et al. | |
| 2012/0031925 | A1 * | 2/2012 | Greenberg | 222/135 |

OTHER PUBLICATIONS

Variblend Inc., "Variblend Dual Dispensing Systems Home," web page, http://variblend.com/index.html, one page, Apr. 27, 2011.

Variblend Inc., "How It Works," web page, http://variblend.com/page7/mac.html, one page, Apr. 27, 2011.

Variblend Inc., "Products," web page, http://variblend.com/page40/page40.html, two pages, Apr. 27, 2011.

Variblend Inc., "Contact Us," web page, http://variblend.com/page11/contactForm.php, Apr. 27, 2011.

West Marine, "Evercoat Gel Kit at West Marine," web page, http://westmarine.com/webapp/wcs/stores/servlet/ProductDisplay?productId=111714, one page, Jul. 26, 2011.

West Marine, "Evercoat Mix 'N' Match Gelcoat Repair Kit at West Marine," web page, http://www.westmarine.com/webapp/wcs/stores/servlet/ProductDisplay?productId=111724, one page, Jul. 26, 2011.

West Marine, "Seafit Resin 004_120_006_503 at West Marine," web page, http://westmarine.com/webapp/wcs/stores/servlet/ProductDisplay?productID39985, Jul. 26, 2011.

West Marine, "Mas Epoxy Gelcoat at West Marine," web page, http://www.westmarine.com/webapp/wcs/stores/servlet/ProductDisplay?productID38855, one page, Jul. 26, 2011.

* cited by examiner

FOLDED PAPER INSTRUCTIONS
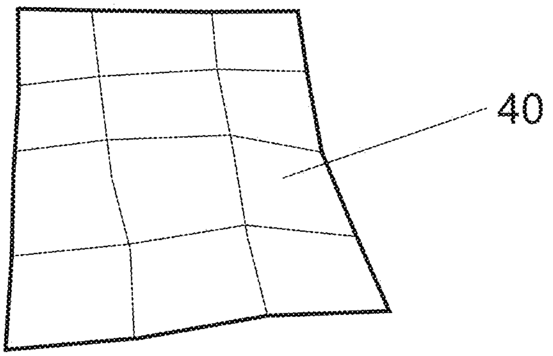
FIG. 2
CD AND DVD INSTRUCTIONS
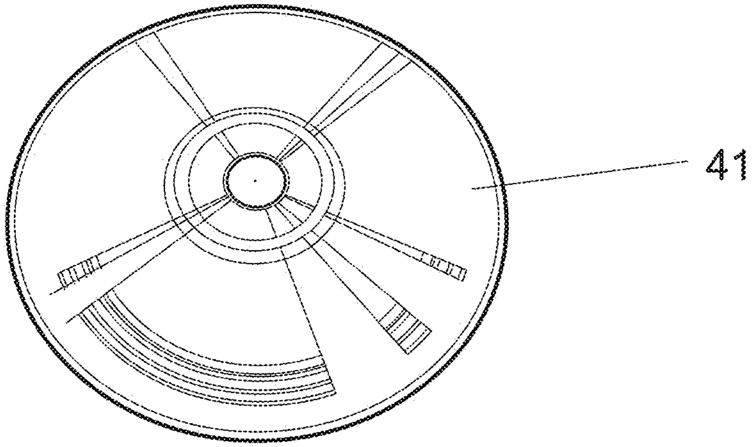
FIG. 3
QR CODE INSTRUCTIONS
42
FIG. 4

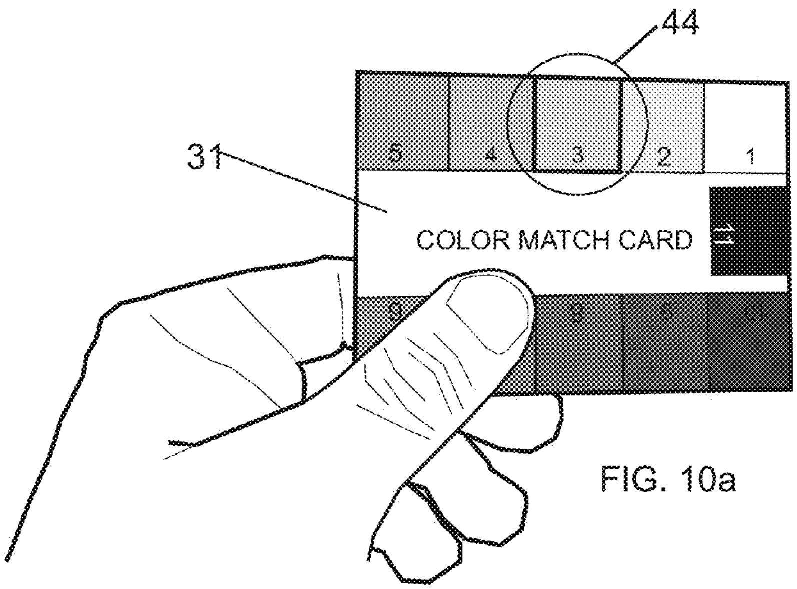
FIG. 10a
| A | B | DIAL SETTING |
|---|---|---|
| 10 | 0 | 1 |
| 9 | 1 | 2 |
| 8 | 2 | 3 |
| 7 | 3 | 4 |
| 6 | 4 | 5 |
| 5 | 5 | 6 |
| 4 | 6 | 7 |
| 3 | 7 | 8 |
| 2 | 8 | 9 |
| 1 | 9 | 10 |
| 0 | 10 | 11 |
49
48
FIG. 10b
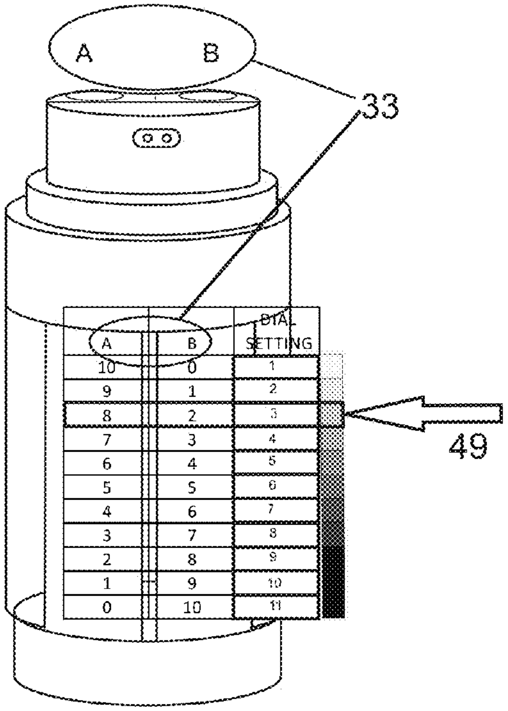
FIG. 10

FIBERGLASS GEL COAT COLOR MATCH AND REPAIR SYSTEM AND METHOD UTILIZING A MULTI CHAMBER DISPENSER DEVICE

REFERENCES CITED:

| | | |
|---|---|---|
| 5,554,197 | September 1996 | Assini |
| US2007/0136958 A1 | June 2007 | Draghiceanu |
| 6,440,175 B1 | August 2002 | Stanley, III |
| EP1563757 A1 | August 2005 | Hayun |
| U.S. Pat. No. 6,314,906 B1 | November 2001 | Tesfaye |
| 7,222,752 | May 2007 | Ponton |
| 6,464,107 B1 | October 2002 | Brugger |
| US2009/0052971 | February 2009 | Pires |
| 5,971,210 | October 1999 | Brugger |
| 6,138,870 | October 2000 | Lin |
| D361,509 | August 1995 | Dull |
| D497,104S | October 2004 | Best |
| D628,086S | November 2010 | Tanner |
| U.S. Pat. No. 7,461,987 B2 | December 2008 | Liechty |
| U.S. Pat. No. 6,920,904 B2 | July 2005 | Yquel |
| D635,459S | April 2011 | Renz |
| US 2012/0031925 | February 2012 | Greenberg |

FIELD OF THE INVENTION

The present invention relates to the field of fiberglass gel coat repair and color matching. More particularly, the present invention relates to kits for color matched repair of fiberglass and gel coat surfaces.

BACKGROUND OF THE INVENTION

The repair of fiberglass gel coat surfaces is often a complex, difficult, and a messy procedure. More often than not, it is performed by a skilled professional due to these undesirable complexities. This type of repair or project is often best left to the seasoned professional in order to achieve a close and acceptable color match that is structurally sound and applied to hold up to the elements and last for years.

Epoxies, gel coats, adhesives, binders, and other additives used in fiberglass gel coat repair exist in a number of different delivery, carrier, and mixing system formats. For example, gel coats can come in pastes, liquids, one-part, two-part, and even multiple-part formats. Each different format requires and involves different measuring, mixing, and handling of the components contained in the kit. The combination of all of these different formats, exemplifies the complexity and the confusion often associated with the repair of fiberglass gel coat surfaces. These numerous challenges in the typical repair kit can be intimidating enough to scare off the more seasoned do-it-yourselfer.

Another impediment and problem faced by individuals in the repair of fiberglass gel coat surfaces is the need for repair kits to be clean, simple, affordable, and be a consistent and repeatable means for the repair of scratches, nicks, cracks and small holes in fiberglass gel coat surfaces. Often times, what is available for purchase and available to use by the do-it-yourself repair person in the retail market is a multitude of colors and hardeners, fillers, and binders that must be mixed together to achieve a color match that with much luck and frustration, results in a color that might be close in matching the surface that is being repaired. Not only must these components be properly mixed to achieve a correct color match, they must also be mixed and combined in such a way to properly ensure structural integrity for a long lasting and appealing structural and cosmetic repair. To add to the confusion, many of the kits that exist and are for sale in the retail market come with colors that the consumer will never use and will eventually end up in the landfill.

A majority of the present day kits offer multiple components with little instruction in terms of color matching. Typical mix and match gel coat repair kits consist of a gel coat paste, six or more coloring agents, hardener solution, mixing sticks and mixing cups, and mixing and color blending instructions.

BRIEF SUMMARY OF THE INVENTION

It is the general purpose and objective of the present invention to provide a method of gel coat color matching and a system and method of delivery and dispensing that offers convenience, ease of use, and consistent and repeatable color matches and repairs that are structurally and cosmetically justified and acceptable. Therefore in accordance with the present invention, there is provided a gel coat color match system including a multi chamber dispenser containing a base color in one reservoir, and including a tint or shade variation in the additional reservoirs.

The system further includes a means to identify color of the repaired surface against the included color match card to identify proper color mix ratio. By instruction and visual match, it is also an object of this invention to provide a unique packaging system and method of delivery that facilitates accurate cosmetic and structural repairs to fiberglass gel coated surfaces. Through the utilization and the ability to achieve variable ratios in the pump heads of this delivery system, the consumer will achieve accurate color matches and metered mix ratios that will simplify the task of fiberglass gel coat color matching and consistent proportioning of base and tint colors to ensure a structurally sound repair consistently and without the mess and waste of the typical repair kits in the market.

It is further an object of this invention to provide a unique method of delivery of resins and or paint in the repair and maintenance of fiberglass gel coat surfaces. It is also an object of this invention to provide a color mixing delivery system that takes the guess work out matching existing surfaces.

A further object of the invention is to provide a kit for repairing gel coat surfaces and structures which eliminates the need for coloring agents to be included therein.

An advantage of the present day invention and system and method there of is that it is easy to use.

Another advantage of the present inventions is that it is convenient to use.

Another advantage of the present day invention is that it is a method developed and manufactured for combining readily available materials and combining them for use in a new and unique way as to promote and produce a new product and invention.

A further object of the present invention is to provide a color mixing method and delivery system having variant degrees of mixing colors in one simple step.

Another advantage of the present invention is that it is a cost effective alternative to existing methods and systems of do-it-yourself repair and offers an alternative to the cost associated with the hiring of a seasoned and skilled professional.

BRIEF DESCRIPTION OF THE DRAWINGS

FIG. 2 showing written instruction included in the gel coat color match repair kit.

FIG. 3 showing audible and visual instruction in the form of a cd or dvd.

FIG. 4 showing packaging QR code that links users to videos and website links pertaining to the instruction of the gel coat color match repair kit.

FIG. 10 showing a schematic view of the label that would be affixed to the dual pump multi chamber container.

FIG. 10*a* showing detail of the color match card and illustrating a color match indicated in highlighted swatch "3" in relation to highlighted area of FIG. 10*b* missing ratio.

FIG. 10*b* showing a detail schematic label for the dual pump multi chamber bottle and illustrating a highlighted "3" selection with a pumping ration of 8:2.

DETAILED DESCRIPTION OF THE PRESENT INVENTION

Figure 1:
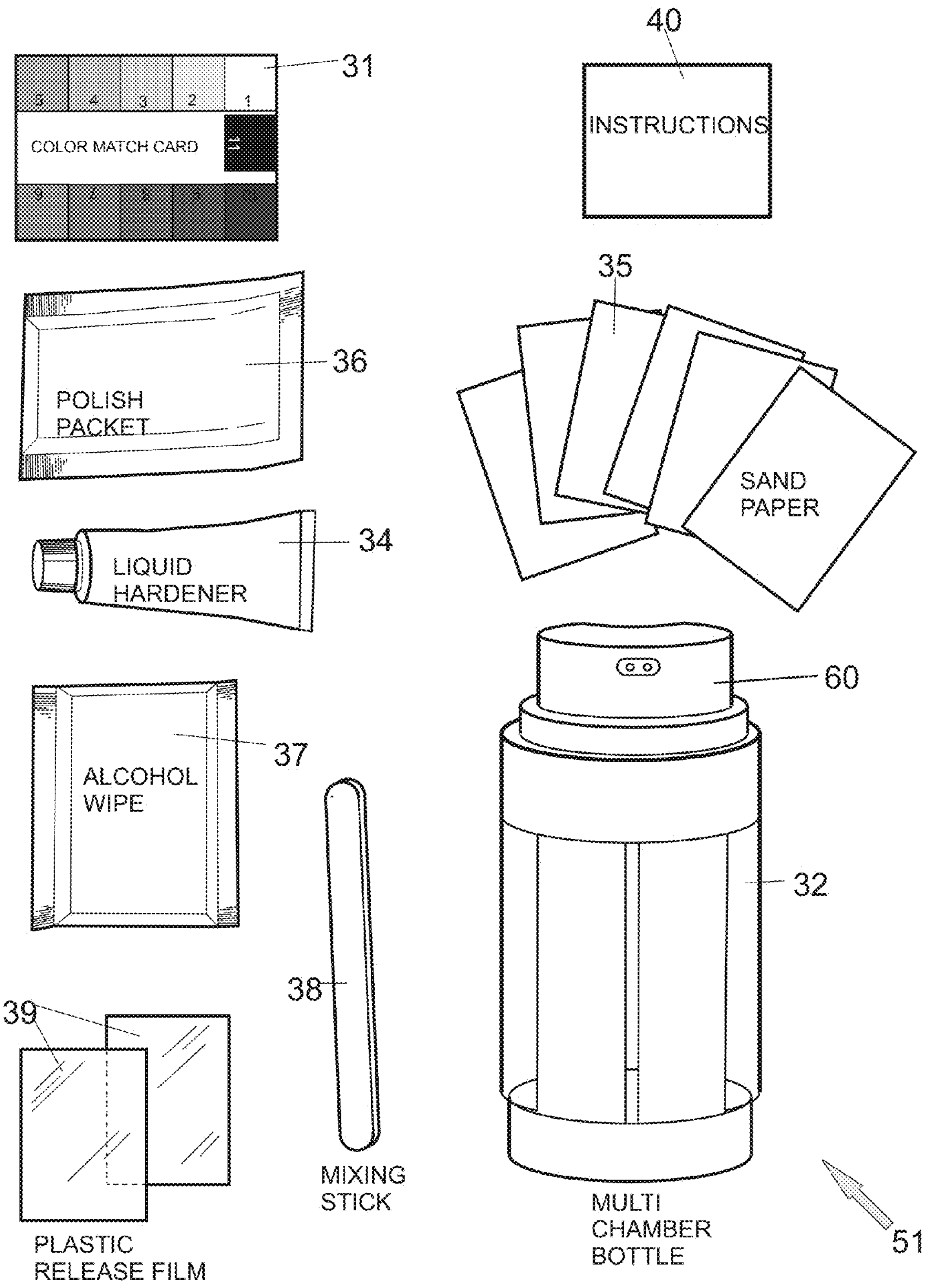
FIG. 1 is an overview of the contents that are included with the present invention. The contents include, but are not limited to: a color match card, polishing packet, liquid hardener, alcohol wipe, plastic release film, mixing stick, instructions, sand paper, and a multi chamber bottle.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

One embodiment of the invention includes a gel coat color match system and method comprising of the steps of; providing a complete gel coat color matching kit 51 with all of the necessary components to complete a finished repair, providing written instruction 40 and visual instruction 41 on how to accomplish a repair using all of the components of the gel coat color matching and repair system, providing a color match card 31 that aids in easily identifying the surface color to be repaired and the correct gel coat color to select on the gel coat color match bottle pump head 60, ease of applying the gel coat to the surface to be repaired with materials and components included, and providing materials and components to finish the repair and restore the surface using original OEM materials.

Figure 15:
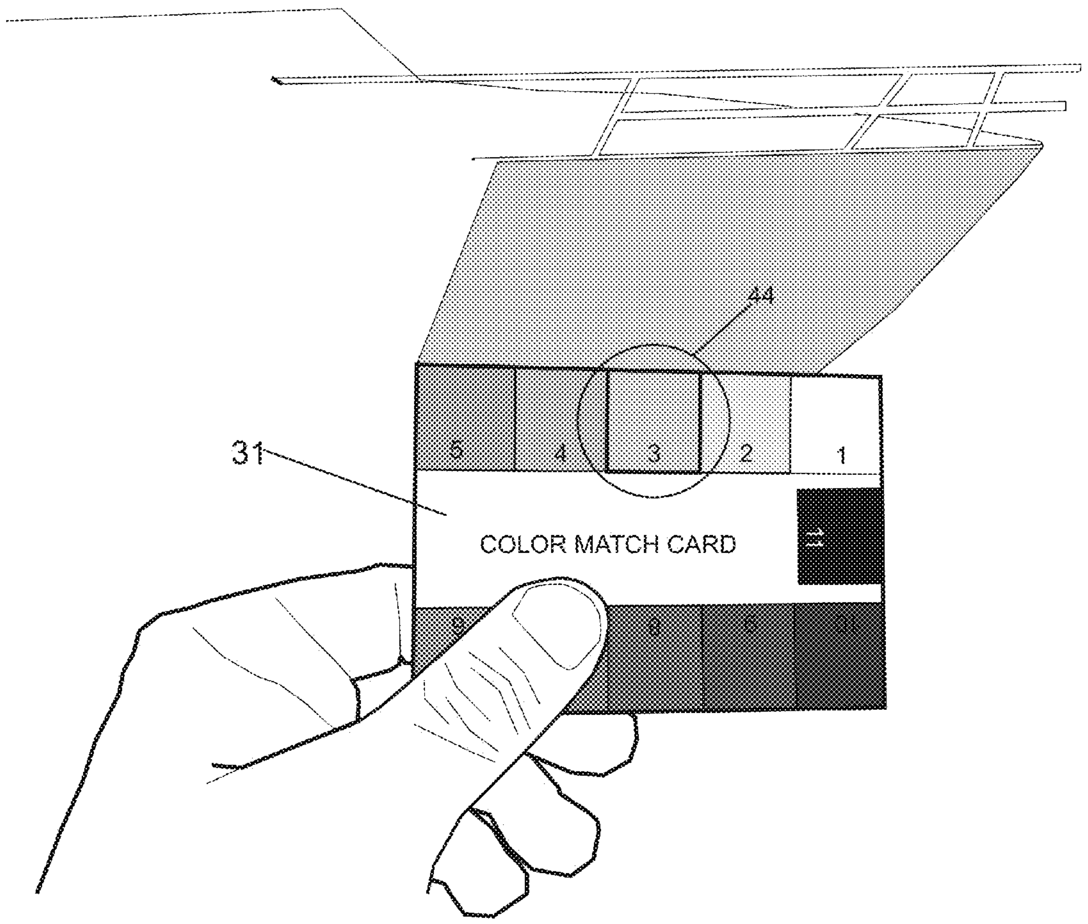
FIG. 15 showing the method of holding the included color match card against the surface to be repaired in order to select proper mixing ration number.

In another embodiment, the present invention includes a color match card 31. The color match card 31 identifies the color of the surface to be repaired when the user holds the card up to the surface in FIG. 15 and visually selects the color swatch that best matches on the color match card 31. Upon selecting the closest match, the color match card 31 will reference a number associated to the color swatch selected and instruction will be given on how to dispense the color selected in relation to the color match number selected. The same referenced shades of color indicated on the color match card 31, as well as the referenced number selected, are also shown on the bottle label 52 in the same format as the color match card 31. The color match card instructs the user on the correct adjustment selection to make on the multi chamber bottle with single pump head 23 and also indicates the correct ratio to pump on the multi chamber bottle with multi pump head 24.

In yet another embodiment, the present invention includes an option for a replaceable reservoir 27 system. The multi chamber reservoir bottle 32 has the ability to be a one-time use system and also has the ability to be a multi-use bottle that can be dismantled, cleaned, and reservoirs replaced. In embodiments where it is a multi-use product, the kit 51 can include additional reservoirs 27 and additional reservoirs 27 can be purchased. Additional reservoirs can be purchased and used to modify colors. To dismantle and exchange color reservoirs 27, bottom cap 28 screws off, old reservoir slides out, new reservoir 27 slides and locks into place, base cap 28 screws back on and gel coat color match bottle pump head 60 is primed according to label instruction 45.

The delivery formats and carriers used in accordance with the present invention, system and method thereof, may be of liquids, gels, crèmes, or pastes. Any other delivery format which meets the criteria of a liquid, gel, crème or paste gel coat may also be used. The carrier must be capable of providing gel coat formulations which are sufficiently viscous so as to avoid substantial spreading upon being expelled from the spout of the containers described within. The phrase "substantial spreading upon being dispensed" should be understood to mean that the fiberglass gel coat solutions and formulations can be dispensed in such a way as to retain and temporarily maintain the dispensed shape unlike the properties of viscous materials similar to the viscosity of water, where, the fluid body does not hold its shape at room temperature and tends to flow rapidly in the direction that gravity pulls it. On the other hand, it is not the intent to use formulations that are so viscous rendering the method of blending, mixing, dispensing, and applying difficult.

While the viscosity and formulations of the gel coat resin compositions used in accordance with the present invention, system, and method thereof are important, more so is the manner in which the formulations are color matched to the surface and substrate to be repaired, the repeatable delivery thereof, and the use of instruction as an aid in the ease of use, product understanding, and efficiency of application.

Figure 5:
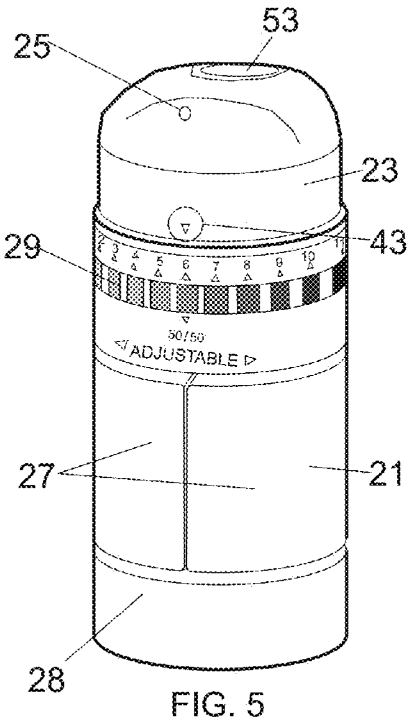
FIG. 5 showing the features of a single pump multi chamber container.

This aspect of the present invention will be better understood by reference to the figures. As shown in FIGS. 5 and 9, variations of multi chamber reservoir bottle 21 in FIG. 5 and multi chamber reservoir bottle 22 in FIG. 9 with attached single pump head 23 in FIG. 5 and with attached multi pump head 24 in FIG. 10 can be provided for retaining and dispensing gel coat resin formulations and solutions. It is also possible for a single container 21 to include a plurality of reservoirs 27 for different gel coats, resins, and paints, and at least one dispensing pump head 60. For example, a single container 21 may be provided having two or more reservoirs 27 of the same or different volume. A base color and additional shade and tint colors can be housed in each of the separate reservoirs 27, and a single dispensing means may be provided with a single orifice 25 or a plurality of orifices 26 such that both the base color and the tint and shade colors can be dispensed proportionately together, singularly, or mixed proportionately in a predetermined and selected ratio. Alternatively, a separate mechanism and apparatus for each reservoir may be provided.

Figure 6B:
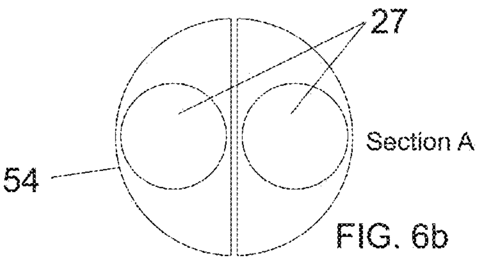
FIG. 6*b* showing a cross section of FIG. 6*a* and showing possible reservoir orientation.

More specifically, as shown in FIG. 5, the container 21 may be formed from semi rigid, opposed reservoirs 27 in a multitude of shapes that can include, but, are not limited to circles, squares, triangles, rectangles and ovals. As shown in FIG. 6*b*, these reservoir shapes are typical to multi chamber dispensing bottles having parallel and opposed reservoirs 54 connected by means of a base cap 28. Additionally, the container may be in the form of a piston actuated multi chambered container where the gel coat compositions are dispensed with a push action in addition to the pre mentioned pump style containers where the base color and additional tint and shade colors are pulled or drawn from the reservoirs 27. The reservoir and the container may be made of an appropriate material that will not degredate, alter, and change in structure and chemical composition when in contact with the chemical compositions of the contents contained within the reservoirs and that which come in contact with the container parts. Appropriate container materials may include but not be limited to plastic, glass, metal, composite materials and combinations of the same.

Each multi reservoir container, 21, should include a dispensing apparatus referred to as a "pump head" 60, which may be, as shown in FIG. 5, a single pump head 23 and as shown in FIG. 9 a multi pump head 24 whereas each pump is similar to the action of pumps used for dispensing liquid soaps, but, in a variable mixing head 23 or ratio mixing head 24. Each dispensing pump head 60 includes a dispensing orifice having a predetermined shape and number of dispensing orifices 25. Of course, as shown in FIGS. 5 and 9, the single dispensing orifice 25 and the multi dispensing orifice 26 can have a variety of shapes that can include, but is not limited to a square, triangle, rectangle, circle or an oval.

Figure 6:
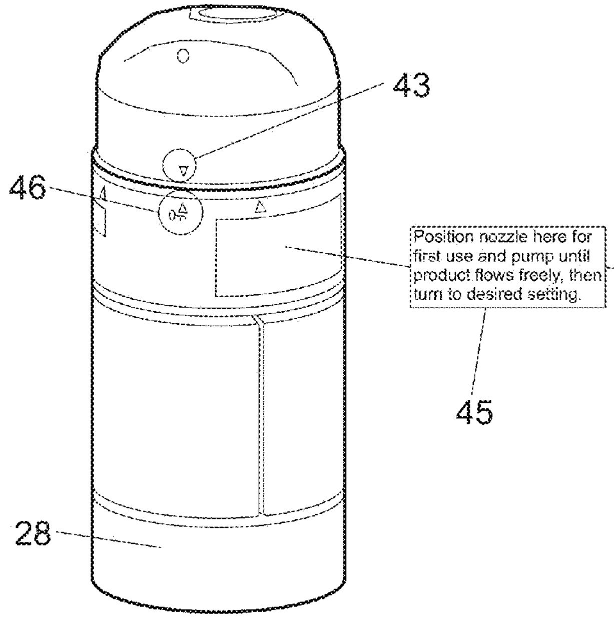
FIG. 6 showing storage position of single pump multi chamber pump head.
Figure 6A:
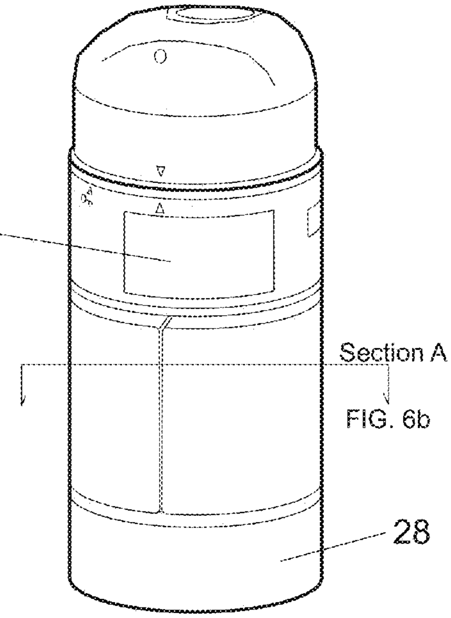
FIG. 6*a* showing pump head priming position and priming instruction detail.
Figure 9B:
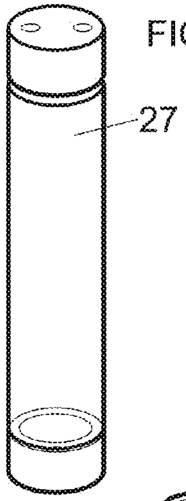
FIG. 9*b* showing included and optional replacement color reservoir.
Figure 9:
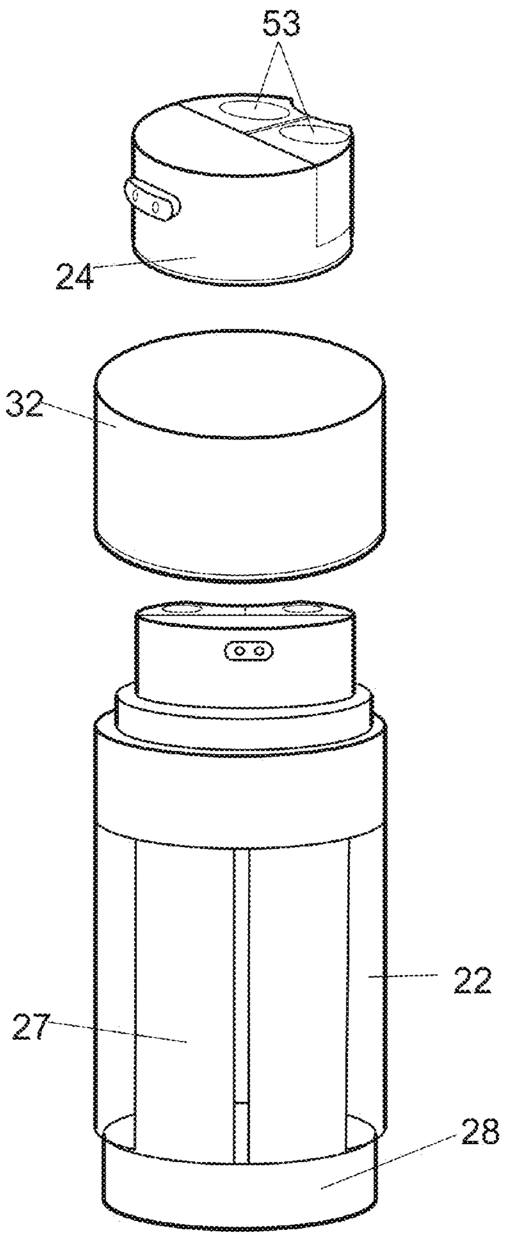
FIG. 9 showing the features of a dual pump multi chamber container.

In one aspect of the present invention, single use dispensing tube style reservoirs 27 in FIG. 9*b* can also be provided, in order to replace gel coat base and tint colors that have been used or depleted. Such a chamber or reservoir 27 tube can also be referred to as a "replacement cartridge" 27. The size and volume of the replacement cartridge 27 can be pre calculated to deliver sufficient material to accommodate repairs of varied sizes and numbers. As shown in FIG. 6*b* as part of section A in FIG. 6*a* are the opposed and parallel reservoirs 27 that may be contained within a typical multi chamber container 21.

Another important aspect of the present invention involves dispensing the gel coat compositions contained within the reservoirs 27 of the container 32. The present invention provides a convenient, useful, non-messy, and, moreover, a consistent and repeatable method and system to dispense and mix the dispensed components of a base color and tint and shade materials from a dispensing system. Therefore, a measuring chart label 29 contained on the side or across the head of the container, allows one to derive a correct color match and correct dispensing ratio when used in conjunction with color match card 31. Alternatively, single pump head 23 and multi pump head 24 can be designed to provide for an accurate metering such that fully depressing the pump head 24 in a pump actuated bottle and an actuated piston in a piston actuated dispenser would provide a fixed volume of material in accordance to and in correlation to the instruction shown and read on the "color matching card" 31 and in correlation to the affixed label 29 on the container 21.

Another important aspect of the present invention is to educate and instruct the user and consumer on how to fully use the kit 51 to repair fiberglass gel coat structures and surfaces that are typical of, but not limited to boat, dock box, tub, shower, airplane, and automotive surfaces, bodies, and structures. It is the available and easy to follow instruction and the completeness of a kit 51 that includes all materials necessary to complete the method of a repair within this present invention that allows for ease of use and adds value and monetary savings for the end user. As shown in FIG. 1, are the contents and components of the present invention referred to as the "gel coat repair kit" 51. FIG. 1 showing contents of "gel coat repair kit" 51 to support the system and method of dispensing, color match, and repair for fiberglass gel coat surfaces and structures. More specifically shown in FIG. 1 of the present invention, a kit 51 of the gel coat color matching and dispensing system showing the dispenser 32, color chart 31, liquid hardener 34, sand paper 35, polishing packet 36, surface cleaner 37, mixing stick 38, plastic release film 39, and instructions 40. Instructions are to include, but not limited to, formats such as a hard copy paper instruction 40 included within the "gel coat repair kit" 51, additional cd or dvd instructions 41, and QR code instructions 42, whereas the QR code 42 is read by a scanning type of device typical of various electronic devices such as smartphones, tablets and devices using this technology, and will direct the user and consumer to a web site where instructional videos and additional downloadable and printable instructions 40 and other resources are contained and available.

Figure 5A:
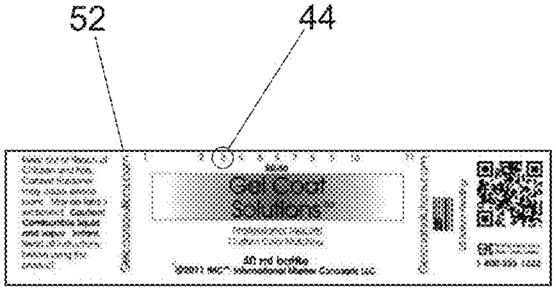
FIG. 5*a* is a front view schematic illustrating the type of label used on a single pump multi chamber container.
Figure 7:
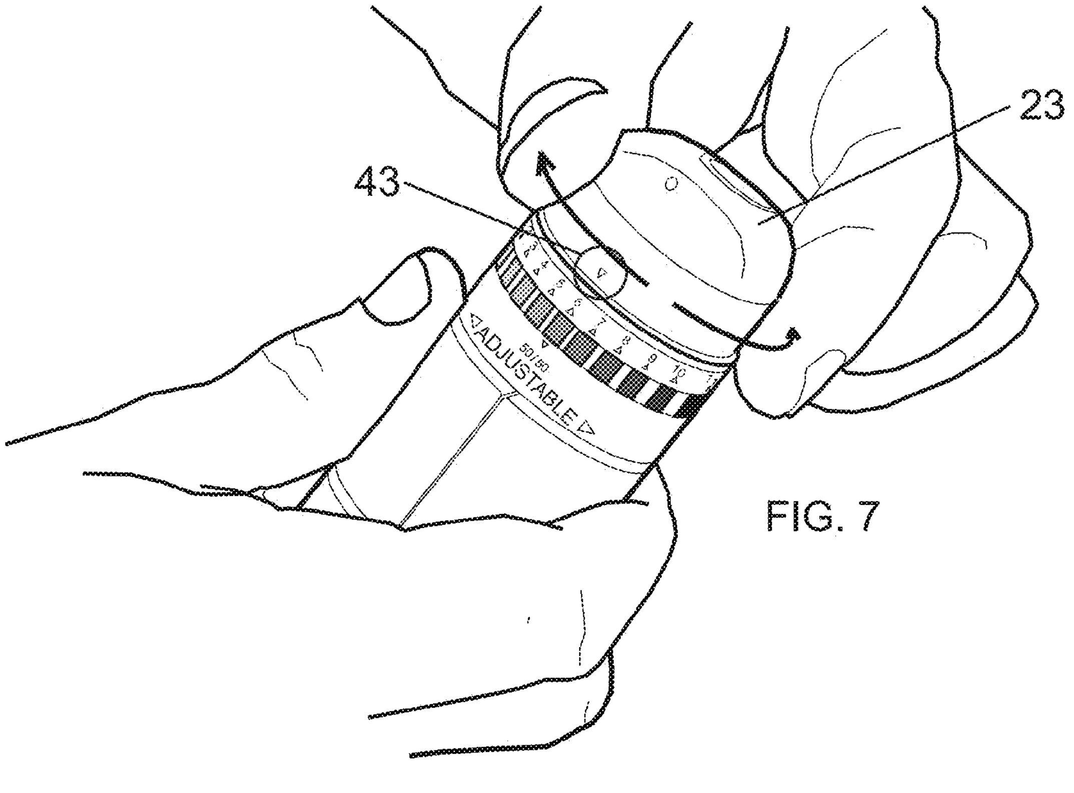
FIG. 7 showing the adjustable pump head and the rotation of the adjustable pump head in order to achieve a correct color match.
Figure 8A:
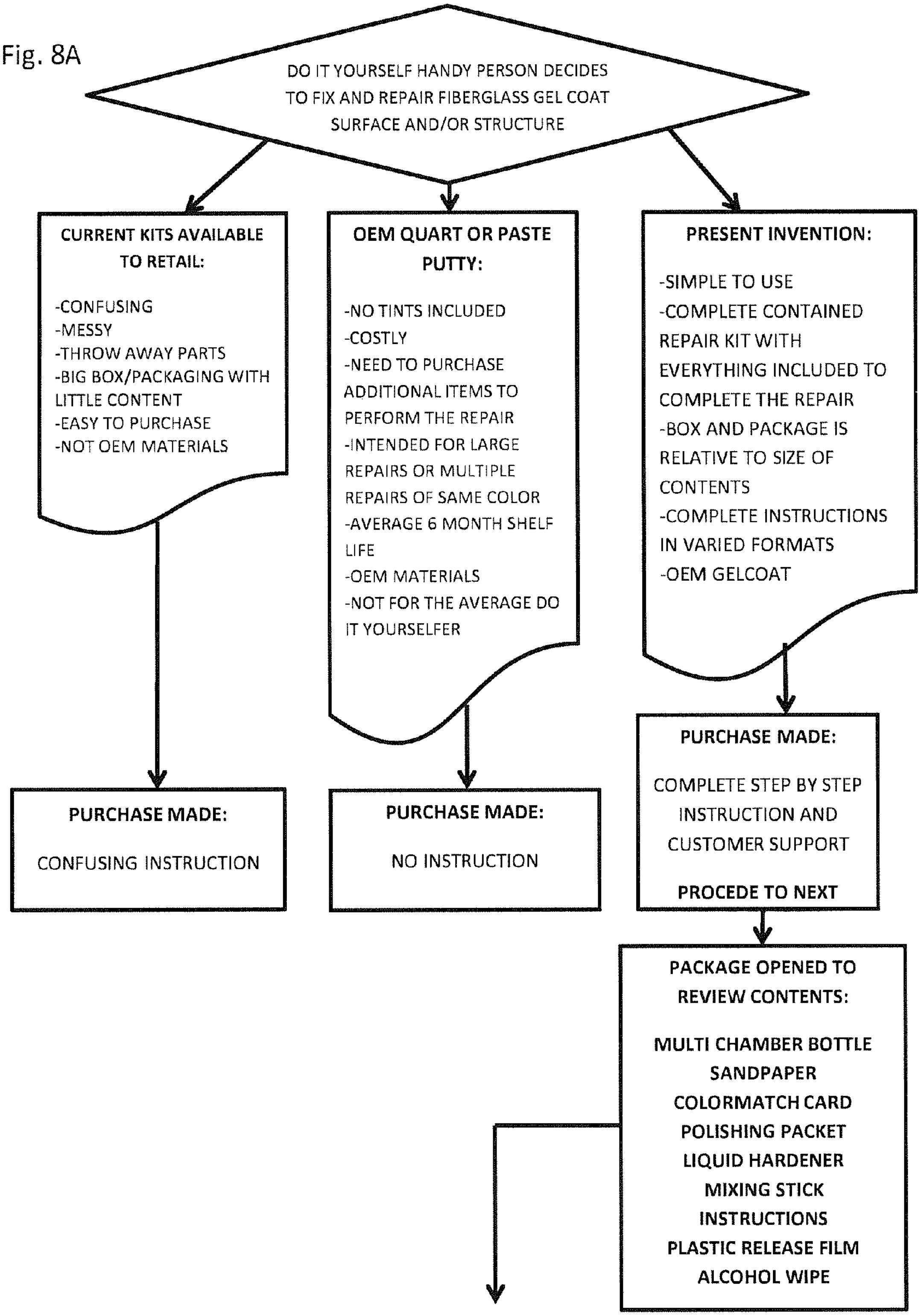
FIGS. 8A-8D is a flow chart showing the work flow and decisions to be made in a typical repair.
Figure 8B:
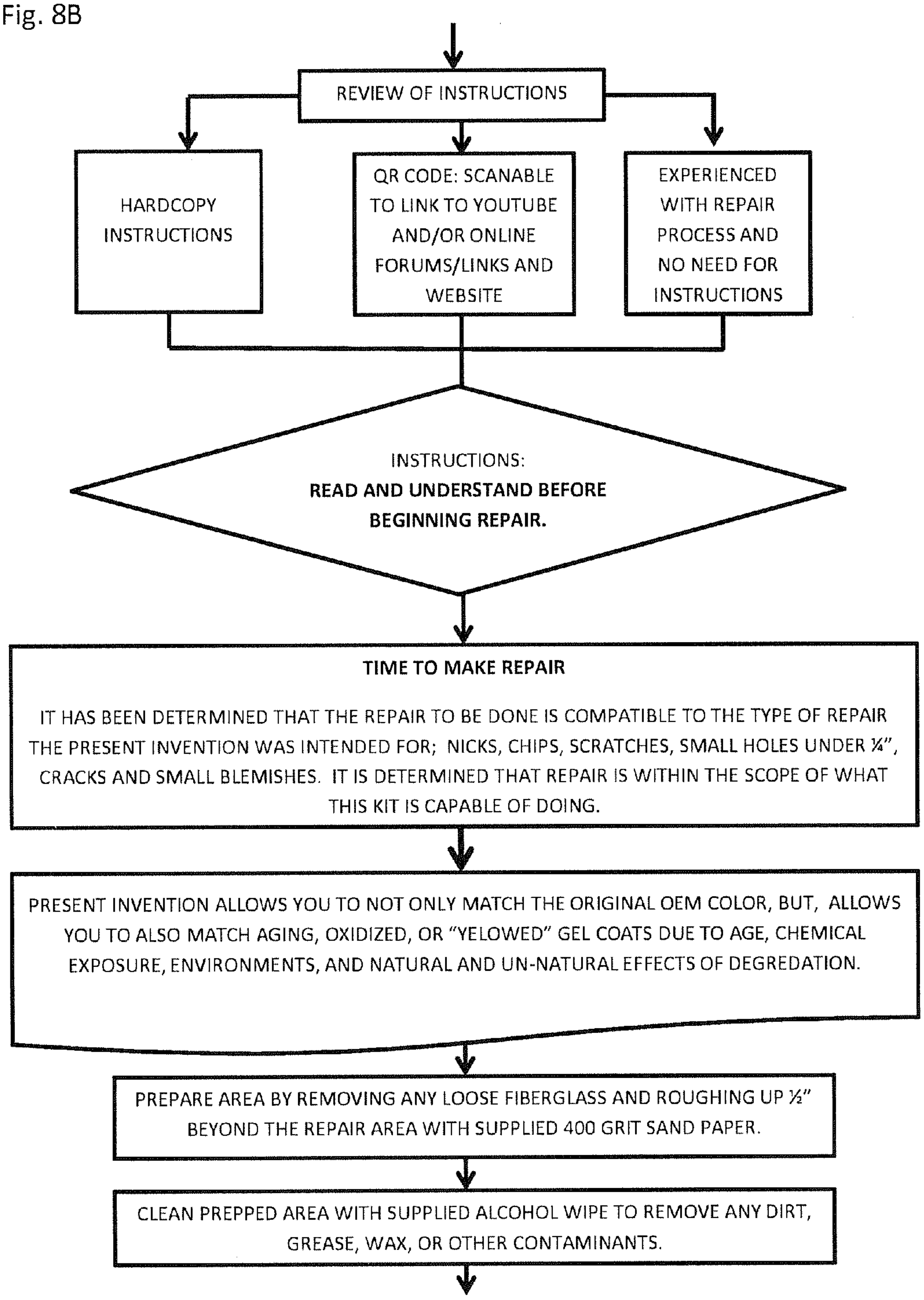
Figure 8C:
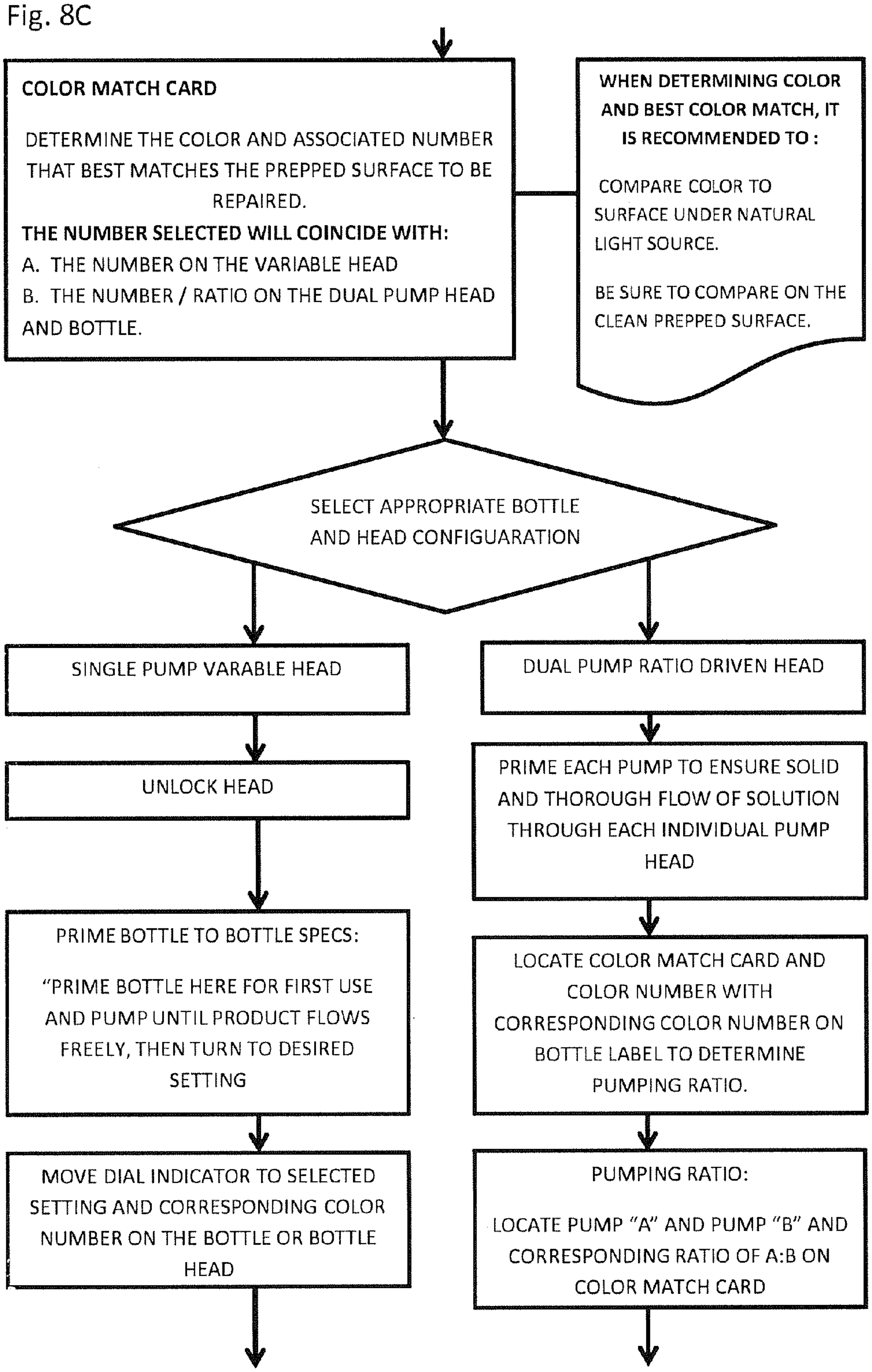
Figure 8D:
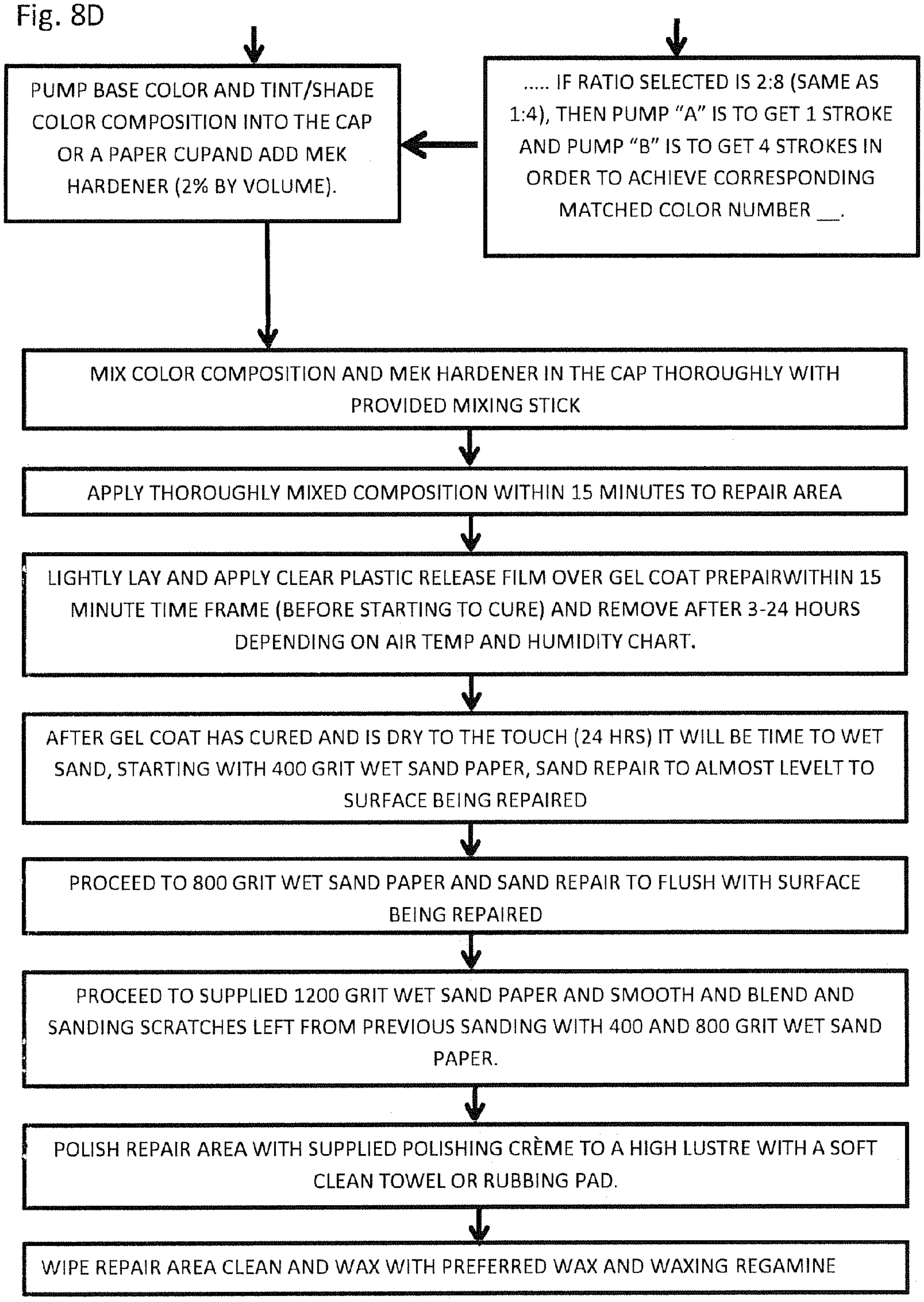
Figure 9A:
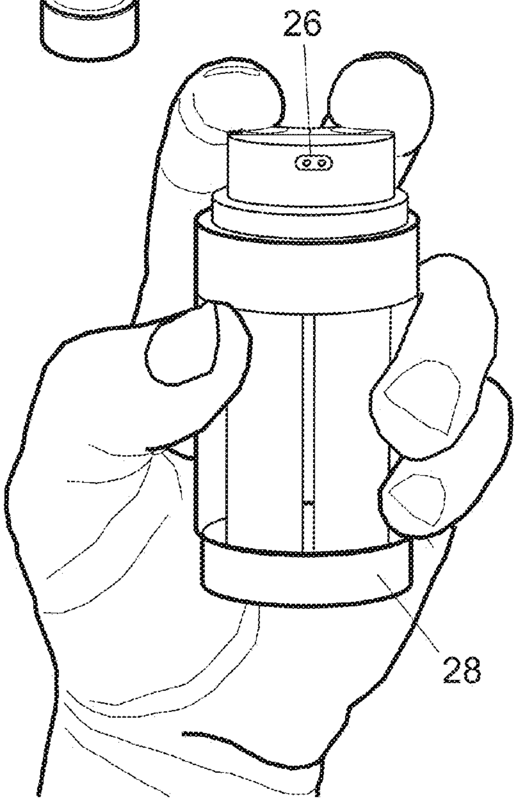
FIG. 9*a* showing the dual pump multi chamber container held to show the orifice and base cap.

For illustrative purposes and to fully understand the gel coat color matching method and system of the present invention, it is necessary to understand the function and performance of the containers and delivery systems. FIGS. 5 and 9 represent the possible container types of the present invention. Each container, the single pump variable head bottle 21 of FIG. 5 and the multi pump ratio bottle 22 of FIG. 9 will be reviewed and discussed individually to show the function and performance that is inherent to, but, not limited to, the efficiency, compatibility, ease-of-use, consistency, and repeatability of the gel coat color match and repair system and method. FIG. 5 shows container 21 as a multi chamber, single pump, and variable mixing head 23. The gel coat color match and repair method and system thereof, can be achieved utilizing multi chamber containers in which the single pump variable head 23 of FIG. 5 and the multi pump ratio head 24 of FIG. 9 function in providing and producing consistent and repeatable color matches and mixes. Container 21 of FIG. 5 shows and describes one embodiment of a container 32 for the delivery of gel coat resin material 30, wherein, the adjustable variable head 23 allows for the ability to dial in a true color match and control the stroke distance and the amount of material drawn from each individual reservoir 27, as will be explained more fully below. Stroke distance and the amount of the base color material and the tint and shade color material flowing out of the reservoirs are proportioned internally within the pump head 60. In an alternate embodiment, an angled disc within the variable pump head 23 limits and allows the distance of the internal plunger to draw and evacuate material from each reservoir 27. In multi chamber container 21, having reservoirs 27 filled with a base color material in reservoir "A" and a tint and shade color material in reservoir "B", the use of the variable head 23 allows for multiple color variations of the base color when combined and mixed with the tint and shade colors. This container 21 is assembled in such a way, that, the base color and the tint and shade colors are drawn from the individual and respective reservoirs 27 that they are contained within, at a calibrated and specific mixing ratio as to afford consistency and repeatability of mixtures and color match compositions. Upon selecting proper color match utilizing the included color match card 31, as will be described more fully below, one can note the applicable number 44 attached to the color on the color match card 31 and select the same number on the variable head 23 of container 21 by lining up arrow mark 43 with respective number on label 29 in FIG. 5 and the relative number 44 on the label 52 as shown in FIG. 5*a*. FIG. 7 shows variable head 23 rotating on a longitude axis contained within the adjustable head 23 and allows for the arrow mark 43 to "click" via detents into the desired color matching position as determined by the color match number 44 associated on label 52 and on color match card 31. Before this type of configuration is to be used and for material to flow from each individual reservoir 27 and orifice 25 in FIG. 5 and orifice 26 in FIG. 9*a*, the instruction 45 on the backside of label 29, must be observed and performed. After initial use of the bottle, and, for future use of left over materials in the reservoirs at a later date FIG. 6, locate arrow 43 to the "key" position 46 in order to lock the pump button 53 and render the container to the "storage Position" 46. Performing this instruction will aid in the shelf life of the material and the performance and the function of the remaining gel coat resins in relation to them flowing through adjustable pump head 23. The aforementioned adjustability and flexibility of color selection when using the gel coat color match repair system and method, allows the user to color match surfaces that have changed slightly in color due to oxidation and exposure to the elements of weather, sun, environment and chemicals.

Further to and in addition to the function and performance of container 21 in FIG. 5 is another variation of the present invention of container 22 in FIG. 9, which consists of a multi chamber dual pump ratio mixing head 24. This configuration has a fixed longitude stroke of each pump 53. Each pump 53 is connected to an individual reservoir 27 in multi pump configurations 24 and is connected to multiple reservoirs 27 in single pump configurations and will draw gel coat specifically from within that reservoir. Mixing, consistency, and repeatability of gel coat compositions is controlled through a ratio pumping chart 48 in conjunction with color match card 31. As an illustration of use in FIG. 10 and FIG. 10*a* for this type of configuration of dual pump system container 22, and not as a limitation, it is determined that the correct color to match the surface to be repaired is number "3" on the color match card 31. Upon defining and determining the correct and best possible color match for the surface to be repaired FIG. 10*a* as number "3" on color match card 31, it is necessary to refer to the ratio label 48 on container 22 to locate and facilitate the correct mixing ratio on color match card 31 for color match number "3" 44 and as shown in 49.

Figure 11:
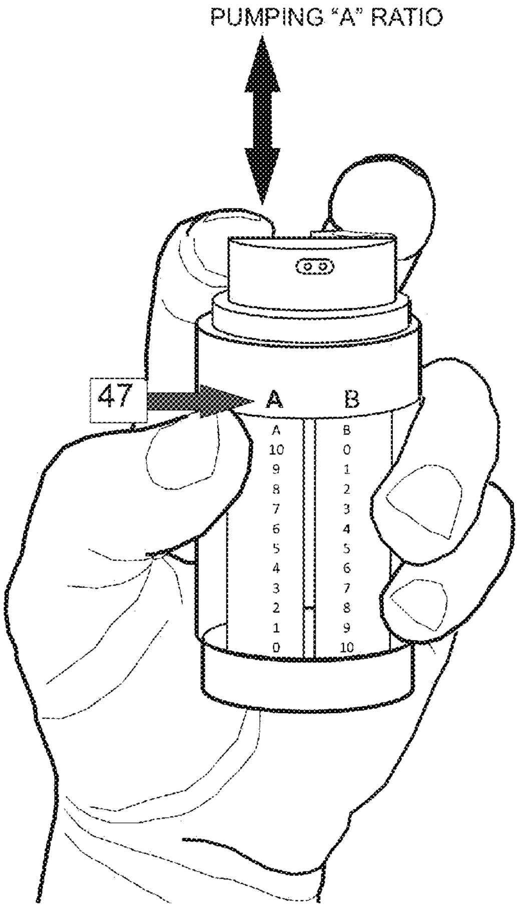
FIG. 11 illustrates the pumping and priming of reservoir "A" and the relation to the pumping ratio on the label to the corresponding pump.
Figure 11A:
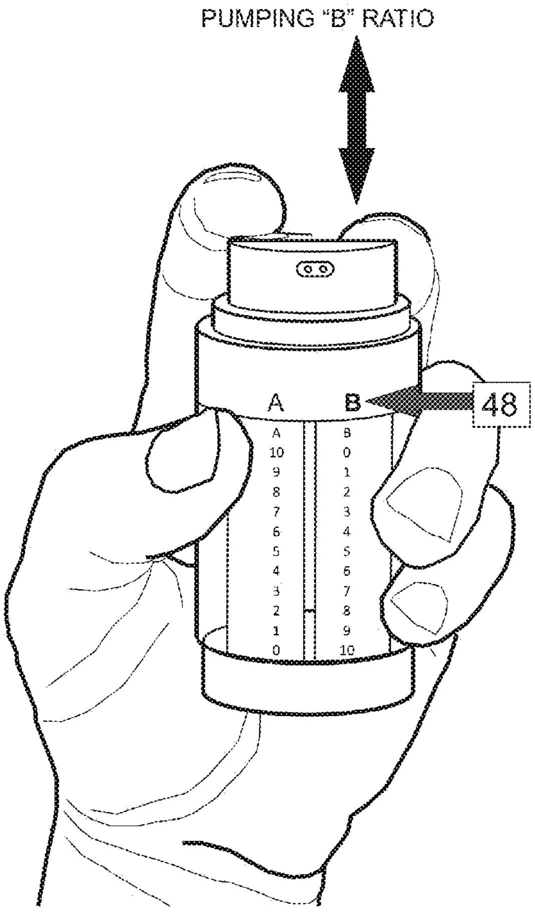
FIG. 11*a* illustrates the pumping and priming of reservoir "B" and the relation to the pumping ratio on the label to the corresponding pump.

By way of explanation and not limitation, as highlighted 49 and observed on the label 48 in FIG. 10*b*, one will find that color match number "3" calls out for a mixing ratio of 8:2. It is to be noted that the label 48 in FIG. 10*b* is shown as a schematic and is shown not attached to the bottle for reason of illustrative visibility. This ratio of 8:2 references Part A: Part B 33, as indicated in FIG. 10. "A" and "B" respectively relate to chamber and reservoir "A" 47 in FIG. 11 and chamber and reservoir "B" 48 in FIG. 11*a* and the number of full strokes as indicated in FIG. 11. In this case the ratio is divisible and the possibility to pump in a 4:1 ratio will achieve the same consistent and reliable color match results as in an 8:2 ratio. Thus, it is necessary to achieve the correct color match "3" by fully depressing pump button on side "A" 4 times for every one full stroke of the pump button on side "B" as indicated in the relative sides in FIG. 11 and in FIG. 11*a*.

Another important aspect and advantage of the present system and method is the use of a color match card 31 as a visual aide in achieving an accurate match to the surface being repaired. Existing methods resort to written instruction, which, can often be misleading and confusing. The present system and method of this invention includes written instruction 40 in FIG. 2 and visual instruction 41 in FIG. 3, and, also offers a color match card 31 as a visual means to correctly and accurately determine color choice by holding the color match card 31 against the surface to be repaired and locating and verifying the correct shade and variations of color to be chosen. Upon determining the correct color by holding color match card 31 against the surface to be repaired, one would then reference the label 29 of the included multi chamber container and either dial in the color match 29 on single pump head 23 or locate the mixing ratio 49 on the label 48 of dual pump head 24 of container 22.

Figure 12:
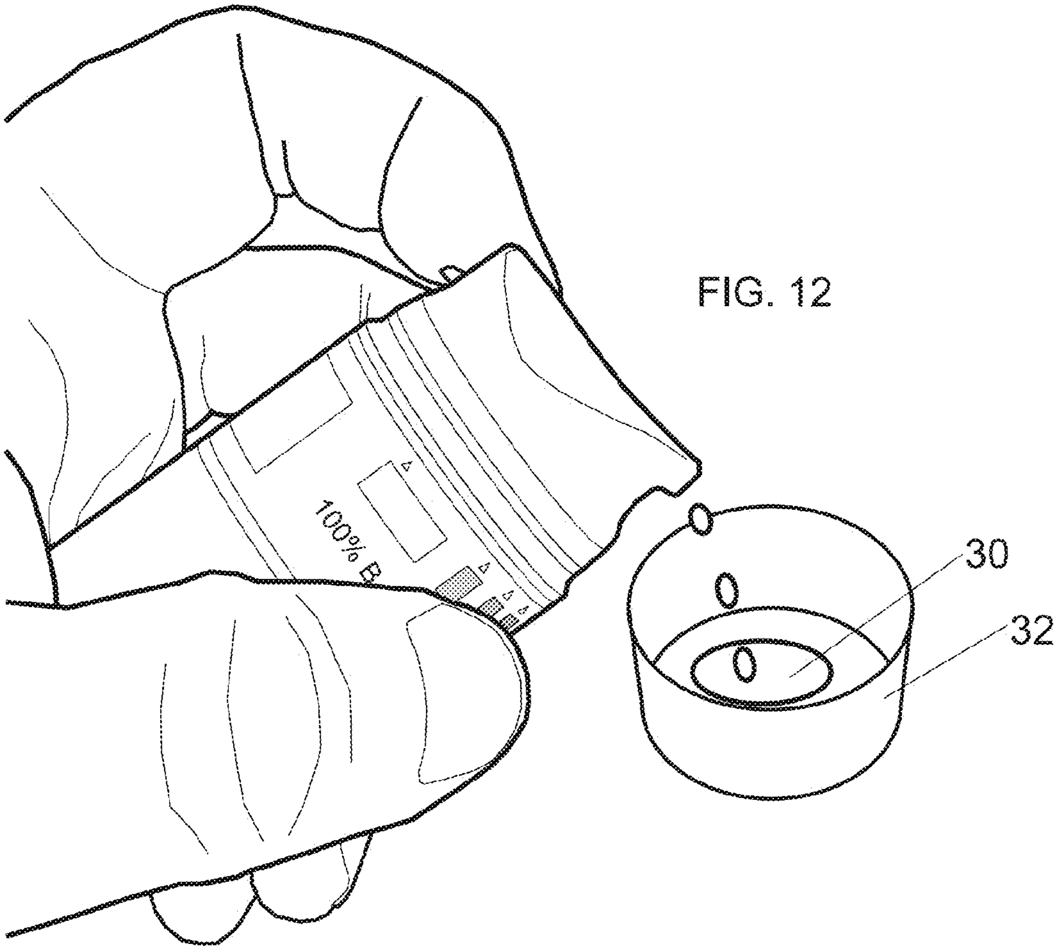
FIG. 12 showing the use of the container cap as a mixing container.
Figure 13:
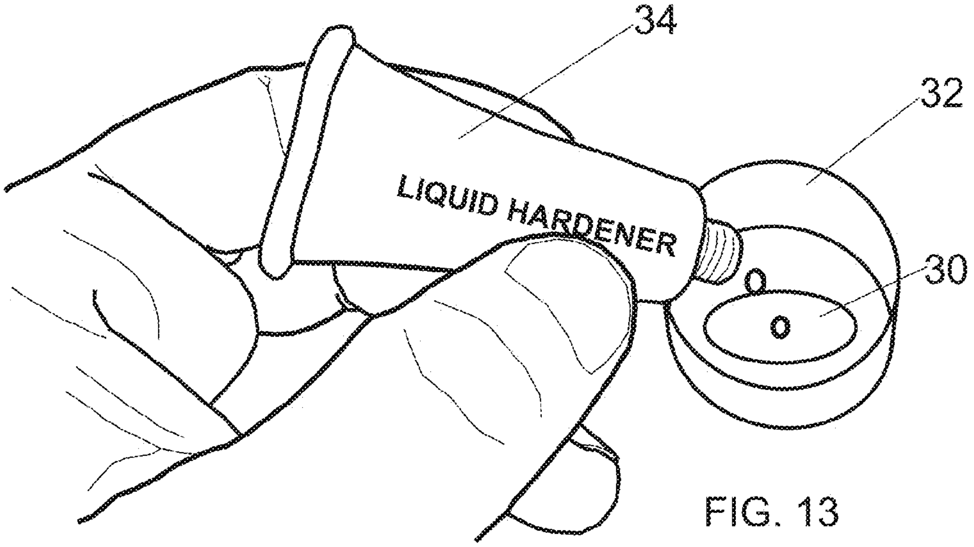
FIG. 13 showing the adding of a catalyst in the form of a liquid hardener to solidify the gel coat mixture.
Figure 14:
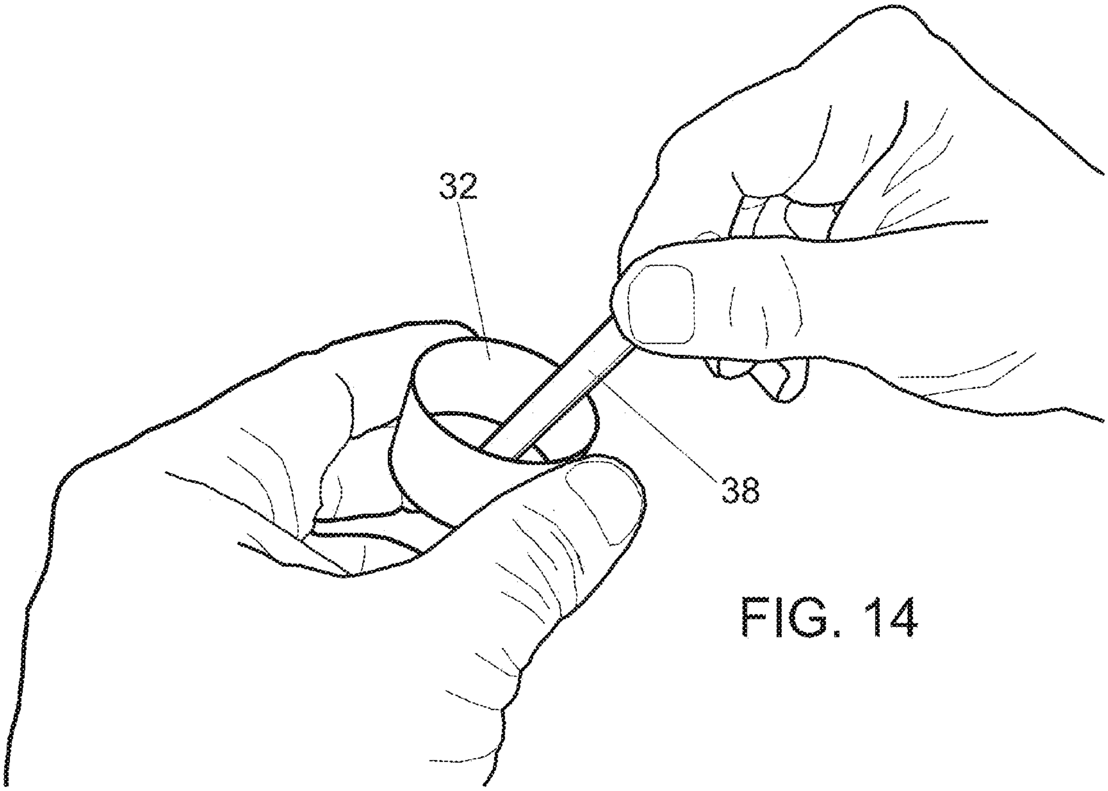
FIG. 14 showing the action of stirring the gel coat composition and liquid hardener with supplied mixing stick.
Figure 16:
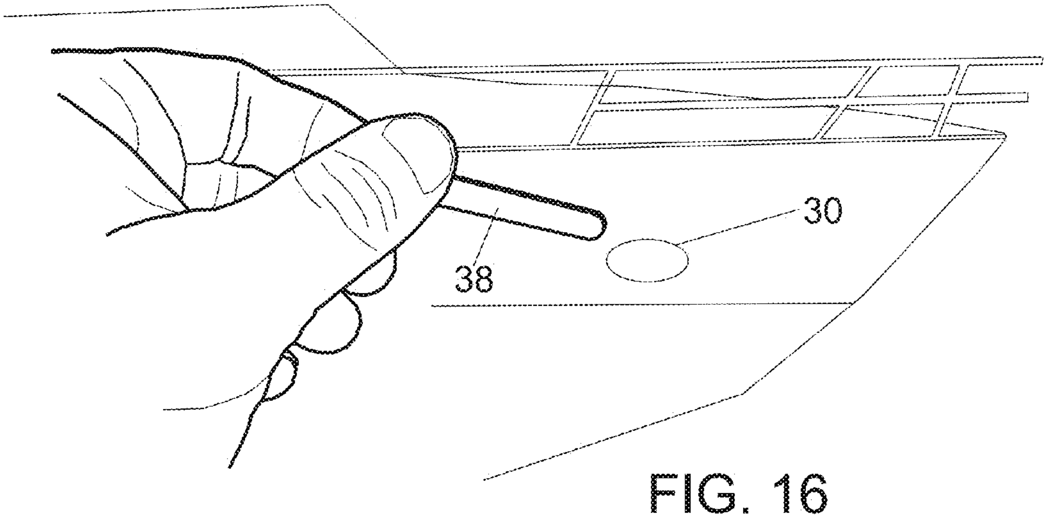
FIG. 16 showing the use of the mixing stick to apply the thoroughly mixed gel coat composition to the repair surface.

FIG. 12 illustrates the convenient use of the cap 32 included on single pump variable mixing container 21 and dual pump ratio mixing container 22 for the mixing of the selected gel coat composition 30. As shown in FIG. 12, selected color match is dispensed into container cap 32 and mixed with liquid hardener 34 in FIG. 13. When the gel coat composition 30 and the liquid hardener 34 are mixed thoroughly together with mixing stick 38, the liquid hardener 34 acts as the catalyst, causing and promoting a chemical reaction between the gel coat composition 30 and the liquid hardener 34, thus, result in the transformation of the two mixtures from liquid state to a solid. Liquid hardener 34 is added at a rate of 4 drops per tea spoon of gel coat (2% by volume) after depositing gel coat composition 30 into container cap 32. Another aspect to the present invention is the inclusion of the cap 32, to contain and allow for the mixing of the gel coat composition 30 and the liquid hardener 34. This addition of the cap 34, adds to the completeness of the kit and does not force the user to make additional purchases, of that which is not existent in existing prior art kits. Upon thoroughly mixing of the gel coat composition 30 and the liquid hardener 34 in FIG. 14, the present invention clearly instructs the user to apply mixture within 15 minutes to ensure proper adhesion and workability of the applied gel coat mixture 30. Upon thoroughly mixing gel coat composition 30 and liquid hardener 34 as illustrated in FIG. 14, gel coat composition mixture 30 is then to be applied to properly prepped surface repair FIG. 16 utilizing the mixing stick 38 included in the present inventions gel coat repair kit 51. The cap 32 is made of such a type of plastic material that is resistant to adhesion of the catalyzed gel coat composition, and, upon the gel coat composition 30 changing from a liquid to a solid in the catalyzing process, one only has to "pinch" the cap to pop out the hardened gel coat composition, thus, rendering the cap clean and useful for another mixture to be made. Instruction for the prepping of the surface is contained within the included hard copy instructions 40 in FIG. 2, additional instructional cd and dvd formats 41 in FIG. 3, or the scan able QR code 42 in FIG. 4 which links users to the website instructional videos and downloadable and printable paper instructions 40.

Figure 17:
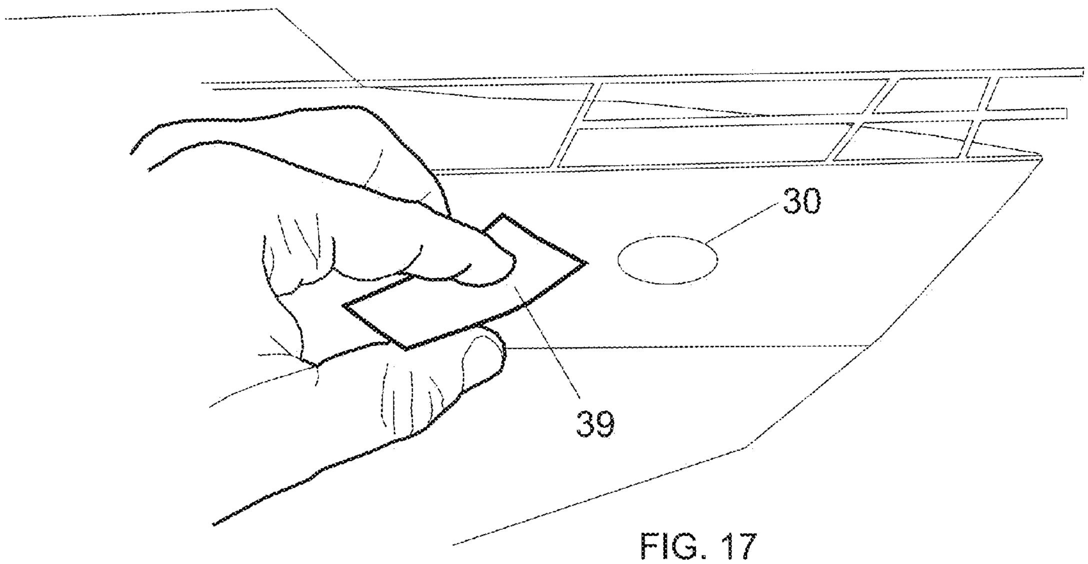
FIG. 17 illustrating the application of the supplied plastic release film to eliminate "sag" on vertical surfaces and to keep out contaminates during the curing time of the gel coat composition.
Figure 17A:
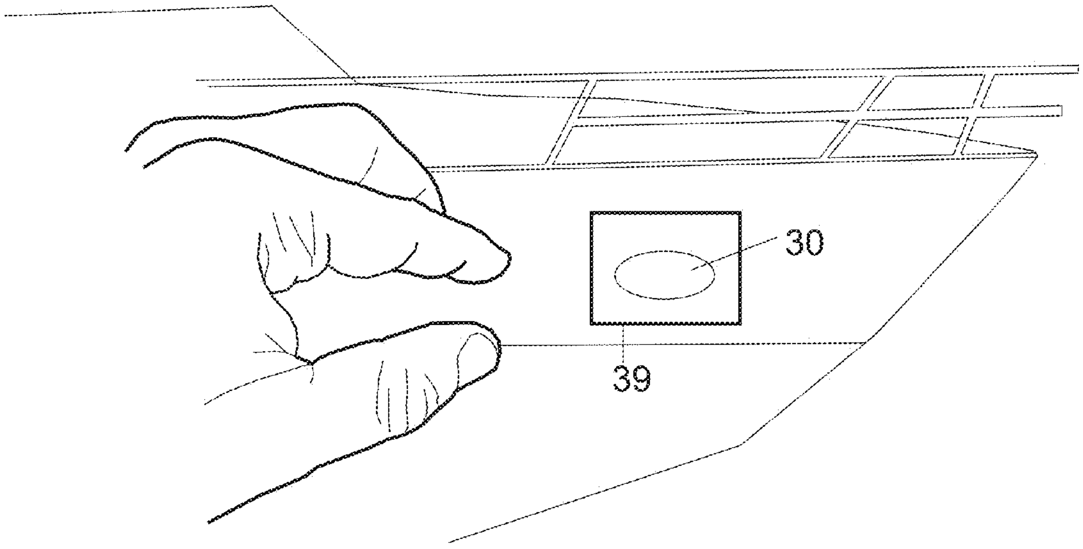
FIG. 17*a* showing plastic release film as applied over the curing gel coat composition repair.
Figure 18:
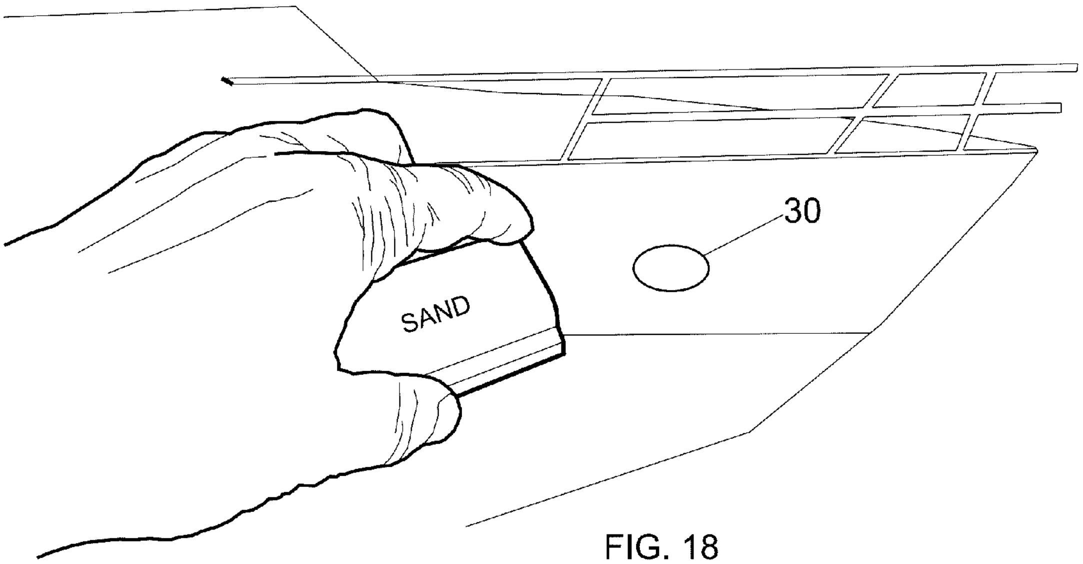
FIG. 18 showing the use and instruction of sanding the repair to level using the supplied sanding papers.
Figure 19:
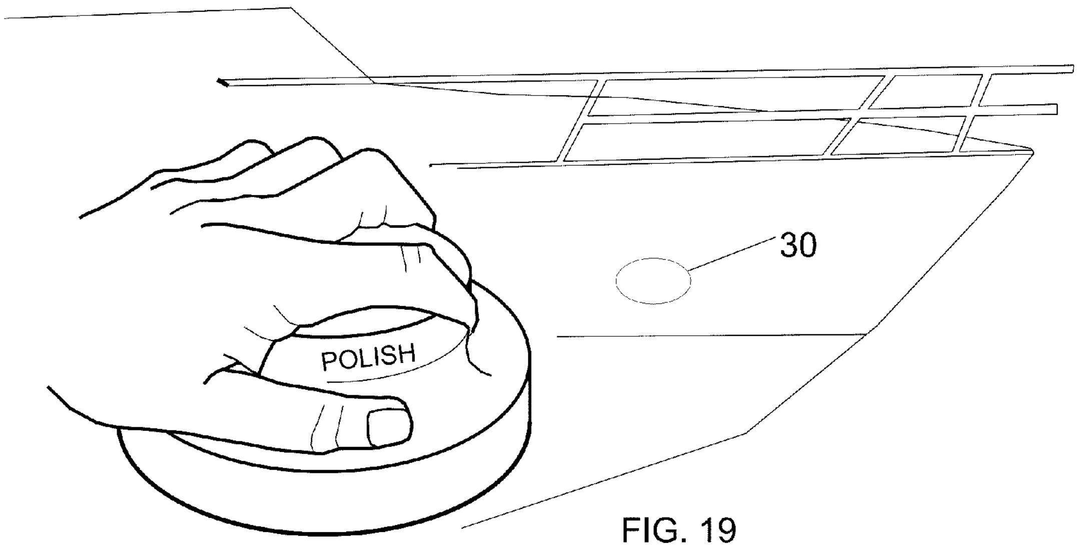
FIG. 19 illustrating the use of supplied polishing packet.
Figure 20:
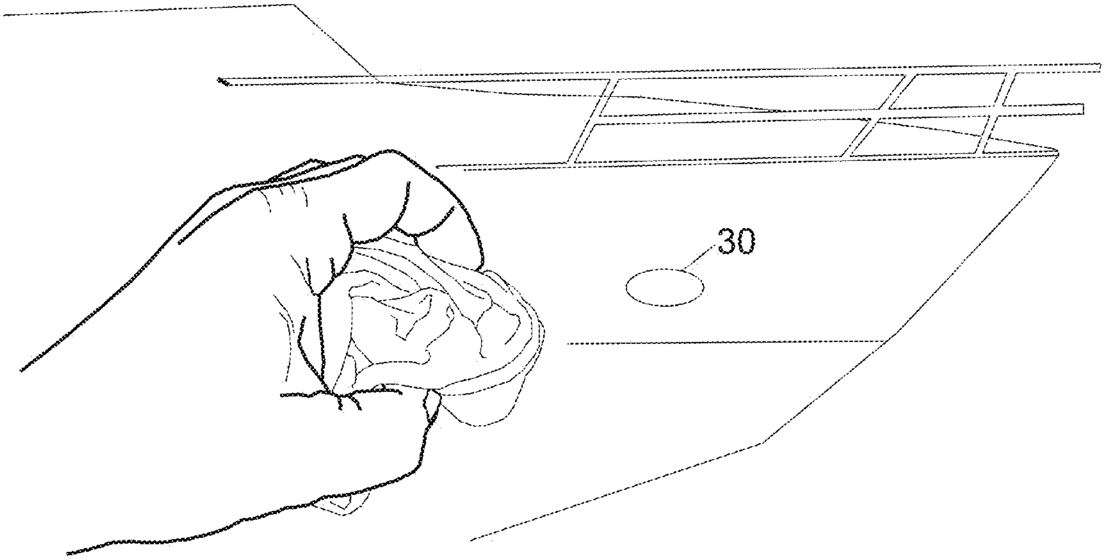
FIG. 20 illustrating the use of wax to finish and add depth and brilliance to the shine and finish of the repair.

On vertical surfaces FIG. 17 and FIG. 17*a*, where gravity may induce dripping or sagging of the gel coat composition mixture 30, it will be necessary to cover repair with included clear plastic release film 39 in FIG. 17. Supplied release film 39 and a combination of osmosis of the plastic release film 39 against the gel coat composition mixture 30, allows for the gel coat composition 30 to fully cure without the effects of drips and sags resulting in an acceptable cosmetic repair. Cosmetic repair refers to the type of repair that is based on the look and visual appeal of the finished product and or surface and to the satisfaction of the user. Cosmetic repair is typically on the outer surface and is not considered a structural component. The curing time of the applied gel coat composition will need a curing time of 3 to 8 hours based on temperature and humidity FIG. 17. Compensations in curing times when factoring in temperature and humidity are included in the instructions 40, instructional cd/dvd 41, and the website instructions available through the QR code 42. FIG. 18 illustrates the process of sanding the fully cured gel coat composition 30 and leveling the repair in order to "blend" in the newly added gel coat composition and repair. Included in the "kit" 51 are sheets of multiple grades and grits of wet sanding papers 35 that will enable the user to achieve a level and fully blended repair. Following the provided instructions 40 and following the instruction on how to use the proper grit sanding paper 35 step by step, allows for the user of the "kit" 51 the ability to achieve professional results at a fraction of the cost of the alternative to hiring of a skilled professional to complete the repair. The last steps to complete the repair involve polishing FIG. 19 with supplied polish packet 36 in order to achieve a glossy and shine to the repair area and waxing the repaired surface FIG. 20 with users personally preferred wax regimen in order to seal the repair and protect and shield the repair from the environment and harsh outside influences.

Another important aspect of the present invention is the ability to install and purchase additional interchangeable color reservoirs 27 allowing for the option to replace an exhausted color and to simply switch out the base and tint color reservoirs 27 to a new and different base color or tint color. This feature of the gel coat color match system and method allows for the container to be a multi-use container and tool and will extend the life and use of the purchase. Replacement of a reservoir 27 is made simple in that, base cap 28 is unscrewed and the reservoir 27 to be replaced and changed simply slides out. Installation of the new reservoir is just the reverse of the pre mentioned procedure.

We claim:

1. A method of repairing a fiberglass gel coat surface, the method comprising steps of:

providing a multi chamber container having replaceable reservoirs, wherein the replaceable reservoirs include a base material reservoir containing a gel coat solution, and at least one tint material reservoir each containing a tint material having a respective color and viscosity, and wherein the multi chamber container includes at least one pump and an adjustable head in communication with the at least one pump, wherein the adjustable head is operable to set a predetermined stroke distance of each at least one pump, the at least one pump in communication with each of the base material reservoir and the at least one tint material reservoir;

selecting a desired portion of the fiberglass gel coat surface to be repaired;

cleaning the desired portion of the fiberglass gel coat surface to define a prepared surface, wherein the prepared surface is adapted to receive the gel coat solution from the base material reservoir and at least one tint material from the at least one tint material reservoir;

selecting a preferred color match swatch of a plurality of color match swatches defined on a color match card, wherein the preferred color match swatch substantially matches a gel coat color of a portion of the fiberglass gel coat surface adjacent the prepared surface, and wherein each color match swatch of the plurality of color match swatches corresponds to an identifier number;

rotating the adjustable head to define a rotational position of the adjustable head that corresponds to the identifier number of the preferred color match swatch and to the predetermined stroke distance of the at least one pump, wherein the predetermined stroke distance defines a predetermined ratio of the gel coat solution and the tint material;

operating the at least one pump the predetermined stroke distance to dispense the predetermined ratio of the gel coat solution and the tint material from the first base material reservoir and the at least one tint material reservoir, respectively; and applying the predetermined ratio of the gel coat solution and the tint material onto the prepared surface, wherein after a curing time, the predetermined ratio of the gel coat solution and the tint material within the prepared surface defines a repaired portion.

2. The method of claim 1, wherein the at least one pump includes a single pump.

3. The method of claim 2, wherein the step of operating the at least one pump includes mixing the predetermined ratio of the gel coat solution and the tint material within a portion of the adjustable head, wherein the adjustable head includes a single orifice through which the mixed predetermined ratio of the gel coat solution and the tint material is dispensed for applying onto the prepared surface.

4. The method of claim 1, further comprising steps of:

applying plastic release film to the prepared surface having the predetermined ratio of the gel coat solution and the tint material applied thereto, wherein the plastic release film holds the predetermined ratio of the gel coat solution and the tint material in place during the curing time of the predetermined ratio of the gel coat solution and the tint material;

sanding the repaired portion; and polishing the repaired portion.

5. The method of claim 1, wherein the predetermined stroke distance is defined by a maximum distance within which the at least one pump can operate, wherein operation of the adjustable head adjusts the maximum distance to define the predetermined stroke distance that corresponds to the rotational position of the adjustable head.

6. A method of repairing a fiberglass gel coat surface, the method comprising steps of:

providing a multi chamber container having a base material reservoir containing a gel coat solution, and a tint material reservoir containing a tint material having a respective color and viscosity, and wherein the multi chamber container includes a pump and an adjustable head in communication with the pump, wherein the adjustable head is operable between a plurality of rotational positions, wherein each rotational position configures the pump to define a predetermined ratio of the gel coat solution and the tint material to be delivered from the multi chamber container during operation of the pump;

selecting a desired portion of the fiberglass gel coat surface to be repaired;

cleaning the desired portion to define a prepared surface, wherein the prepared surface is adapted to receive the gel coat solution from the base material reservoir and the tint material from the tint material reservoir;

selecting a preferred color match swatch of a plurality of color match swatches defined on a color match card, wherein the preferred color match swatch substantially matches a gel coat color of a portion of the fiberglass gel coat surface adjacent the prepared surface, and wherein each color match swatch of the plurality of color match swatches corresponds to an identifier number;

rotating the adjustable head to define the rotational position of the adjustable head that corresponds to the identifier number of the preferred color match swatch and to the predetermined ratio of the gel coat solution and the tint material, wherein operation of the adjustable head modifies a predetermined stroke distance that the pump is permitted to travel within the adjustable head;

operating the pump the predetermined stroke distance, wherein the predetermined ratio of the predetermined ratio of the gel coat solution and the tint material is drawn from the base material reservoir and the tint material reservoir, respectively; and applying the predetermined ratio of the gel coat solution and the tint material onto the prepared surface, wherein after a curing time, the predetermined ratio of the gel coat solution and the tint material within the prepared surface defines a repaired portion.

7. The method of claim 6, wherein the multi chamber container includes a cap adapted to receive the predetermined ratio of the gel coat solution and the tint material and a catalyst, wherein the catalyst modifies the curing time of the predetermined ratio of the gel coat solution.

* * * * *